US008553265B2

(12) United States Patent
Sawamura

(10) Patent No.: US 8,553,265 B2
(45) Date of Patent: Oct. 8, 2013

(54) IMAGE PROCESSING SYSTEM, IMAGE PROCESSING APPARATUS, AND RECORDING MEDIUM

(75) Inventor: Megumi Sawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 386 days.

(21) Appl. No.: 12/986,476

(22) Filed: Jan. 7, 2011

(65) Prior Publication Data

US 2011/0176166 A1    Jul. 21, 2011

(30) Foreign Application Priority Data

Jan. 19, 2010  (JP) ................................ 2010-009384

(51) Int. Cl.
*G06F 3/12*        (2006.01)
*G06K 15/00*      (2006.01)

(52) U.S. Cl.
USPC ........................................ 358/1.15; 358/1.18

(58) Field of Classification Search
None
See application file for complete search history.

(56) References Cited

U.S. PATENT DOCUMENTS

| 2005/0231766 A1* | 10/2005 | Kato ............................ 358/1.18 |
| 2006/0262340 A1* | 11/2006 | Lee ............................. 358/1.14 |
| 2008/0195590 A1  | 8/2008  | Nakamura et al. |
| 2009/0168098 A1* | 7/2009  | Tanaka ......................... 358/1.15 |

FOREIGN PATENT DOCUMENTS

| JP | 2004-185044 | 7/2004 |
| JP | 2006-018640 | 1/2006 |
| JP | 2008-217750 | 9/2008 |
| JP | 2010-166174 | 7/2010 |

* cited by examiner

*Primary Examiner* — Dov Popovici
(74) *Attorney, Agent, or Firm* — IPUSA, PLLC

(57) ABSTRACT

A disclosed image processing system includes an image forming apparatus and an image processing apparatus connected via a network, wherein the image forming apparatus includes a receiving portion receiving a designation of a workflow produced by arbitrarily assembling a plug-in of an image dividing and converting process for image data and a plug-in of an output process and includes an image dividing and converting process, and a communicating portion transmitting a request for processing the workflow to the image processing apparatus along with the image data, and the image processing apparatus includes a workflow controlling portion carrying out the processes when a request for carrying out these processes is received, and a workflow processing portion carrying out the workflow while dividing the image data by using a length of a longitudinal side of the image data based on a control with the workflow controlling portion.

9 Claims, 18 Drawing Sheets

IMAGE PROCESSING SYSTEM, IMAGE PROCESSING APPARATUS, AND RECORDING MEDIUM

BACKGROUND OF THE INVENTION

1. Field of the Invention

The present invention generally relates to an image processing system, an image processing apparatus, and a recording medium saving an image dividing program.

2. Description of the Related Art

In recent years, image input and output apparatuses such as a multifunction peripheral are installed in or connected to networks in many business organizations. The image input and output apparatuses play a great role as a measure for making business more efficient. Especially, an image processing system for making computerization and distribution of paper documents more efficient becomes increasingly important. A large factor in structuring the image processing system is an image input apparatus such as a scanner and an image processing server. Plural delivery processing menus for various works and uses are registered in the image processing server in advance. Users can carry out a scan by selecting a suitable one for the work from processing menus suitable for works on an operations panel of a scanner.

For example, Patent Document 1 discloses a technique in which a delivery operation or an image converting operation is enabled to be plugged in, and a user or an administrator makes workflows of input, image conversion, and output by arbitrarily combining these plug-ins and delivers the image data using the made workflows.

Patent Document 2 discloses a technique in which a designated manuscript is printed so that new chapters are printed on front faces of papers when a single-sided manuscript is copied to double sides of papers.

With the above described image processing system, there is a demand of dividing image data aggregated as 2-in-1 into two sheets of 1 in 1 when the image data are aggregated as 2-in-1. Patent Document 2 merely determines discontinuities of the manuscript and cannot divide image data by providing, for example, a plug-in for dividing into chapters. Therefore, with the background art, it is not possible to divide an image and send it in conformity with a user' request.

Patent Document 1: Japanese Laid-Open Patent Application No. 2006-018640

Patent Document 2: Japanese Patent No. 3645564

SUMMARY OF THE INVENTION

Accordingly, embodiments of the present invention provide a novel and useful image processing system, image processing apparatus, and recording medium solving one or more of the problems discussed above.

More specifically, embodiments of the present invention provide a novel and useful image processing system, image processing apparatus, and recording medium which can divide image data and deliver the divided image data in consideration of the above problems.

One aspect of the embodiments of the present invention may be to provide an image processing system including an image forming apparatus and an image processing apparatus connected via a network, wherein the image forming apparatus includes a receiving portion configured to receive a designation of a workflow which is produced by arbitrarily assembling at least a plug-in of an image dividing and converting process for image data and a plug-in of an output process and includes an image dividing and converting process for dividing the image data, and a communicating portion configured to transmit a request for processing the workflow to the image processing apparatus along with the image data received from the image forming apparatus, wherein the image processing apparatus includes: a workflow controlling portion configured to carry out any one of the image dividing and converting process, the output process, and the divided image dividing and converting process included in the workflow when a request for carrying out the any one of the image dividing and converting process, the output process, and the image dividing and converting process is received from the image forming apparatus, and a workflow processing portion configured to carry out the workflow while dividing the image data by using a length of a longitudinal side of the image data based on a control with the workflow controlling portion.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5 illustrates an example of setting up a workflow and an image dividing plug-in.

FIG. 7A, FIG. 7B and FIG. 70 illustrate an example 1 of dividing an image.

FIG. 8A, FIG. 8B and FIG. 80 illustrate an example 2 of dividing an image.

DETAILED DESCRIPTION OF THE PREFERRED EMBODIMENTS

A description is given below, with reference to the FIG. 1 through FIG. 18 of embodiments of the present invention.

Reference symbols typically designate as follows:
10, 20, 60: MFP;
30: image processing server;
40: image managing server;
50: information processing terminal;
101: image reading portion;
102: communicating portion;
103: receiving portion;
104: storing portion;
301, 400: workflow setting portion;
302: communicating portion;
303: job executing portion;
304: workflow controlling portion;
305, 701: workflow processing portion;
306: storing portion;
351, 711: image dividing portion;
352: form converting portion;
354: folder delivering portion;
355: mail transmitting portion;
402: coupling determining portion;
403: storing portion; and
601: setting portion.

With the embodiments, a multifunction peripheral in which a printer function, a scanner function, a copy function and a facsimile function are installed in one casing is exemplified. However, the present invention is not limited thereto. As long as the image data can be input, the present invention is applicable to any one of a scanner, a facsimile machine, a copy machine and so on.

Embodiment 1

Image Processing Apparatus and Hardware

Figure 1:
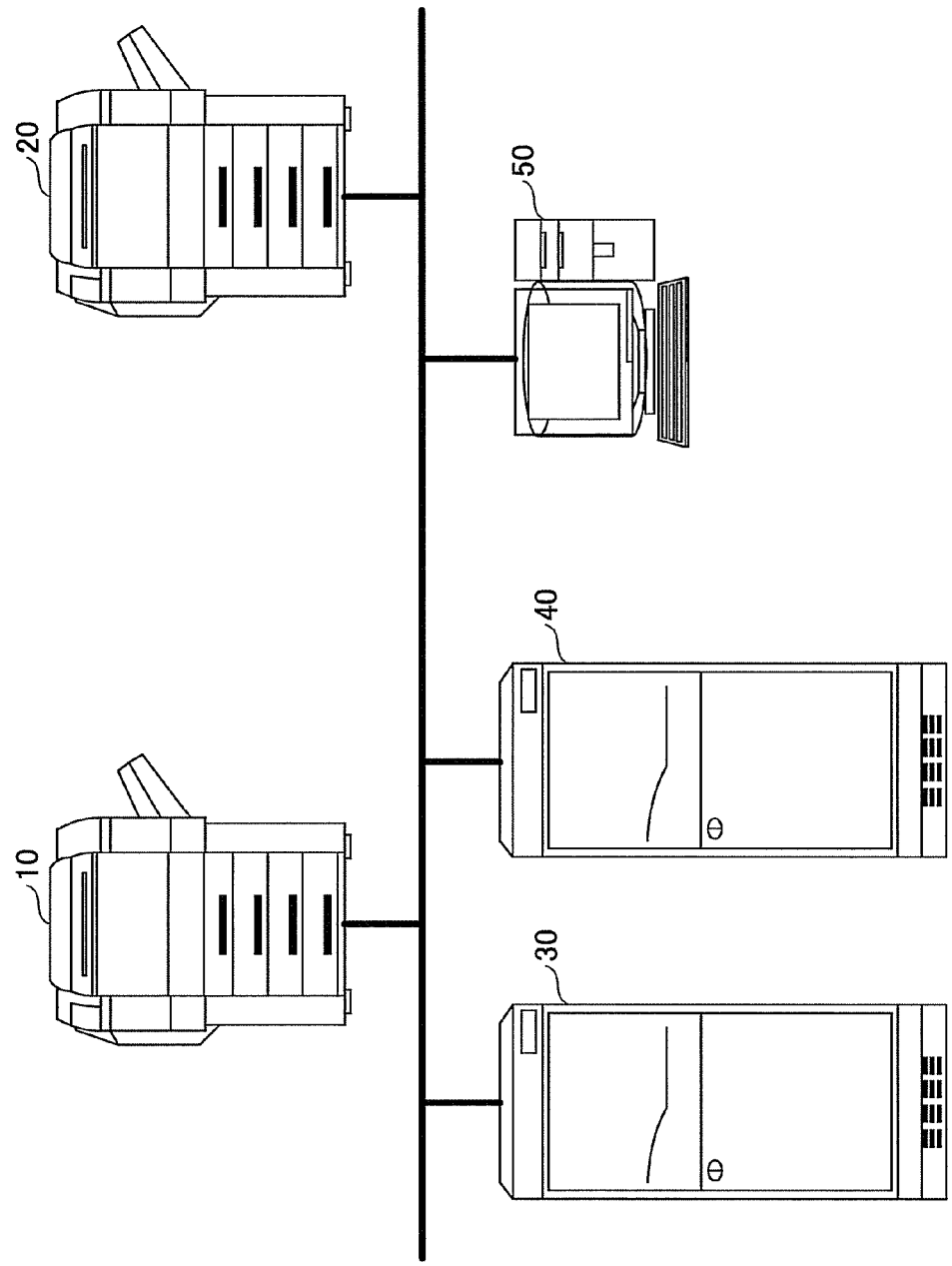
FIG. 1 illustrates an example image processing system of Embodiment 1.

FIG. 1 illustrates an example image processing system of Embodiment 1. As illustrated in FIG. 1, the image processing system includes a Multifunction Peripheral (MFP) 10, a MFP 20, an image processing server 30, an image managing server 40, and an information processing terminal 50 such as a Personal Computer (PC) and a Personal Data Assistance (PDA), which are connected via a network. Hereinafter, an MFP is exemplified as the image processing apparatus.

The MFP 10 and the MFP 20 have a scan function, a copy function, a printer function, and a facsimile function in one casing. The MFP 10 and the MFP 20 generate image data by scanning a paper medium or the like by the scanner function, and the generated image data are transmitted to the image processing server 30. A detailed description of the MFP is given later. The image data contain image data of documents.

The image processing server 30 receives image data scanned by each MFP and carries out various processes and delivery in conformity with the designated workflow. The workflow includes mail transmission, facsimile transmission, folder delivery, and so on.

The image processing server 30 carries out a workflow based on input image data and carries out an accumulation of documents or delivery in conformity with a workflow constructed by a user. From a standpoint of processing images, the image processing server 30 functions as an image processing apparatus. A detailed description of the image processing server 30 will be described later. The image processing server 30 may be assembled in the MFP 10 or the MFP 20.

The image managing server 40 accumulates and manages the image data delivered from the image processing server 30. Further, the image managing server 40 can register image types of the accumulated image data and can search the accumulated image data.

The information processing terminal 50 produces a workflow by sequentially selecting plug-ins of image conversion and output. The formed workflow is stored in the image processing server 30. The number of the MFPs and the information processing terminals which are connected via the network may be an arbitrary number. The image processing system may have a mail delivery server or the like. When the image processing server 30 is assembled into the MFP, it is possible to produce the workflow in the MFP.

Figure 2:
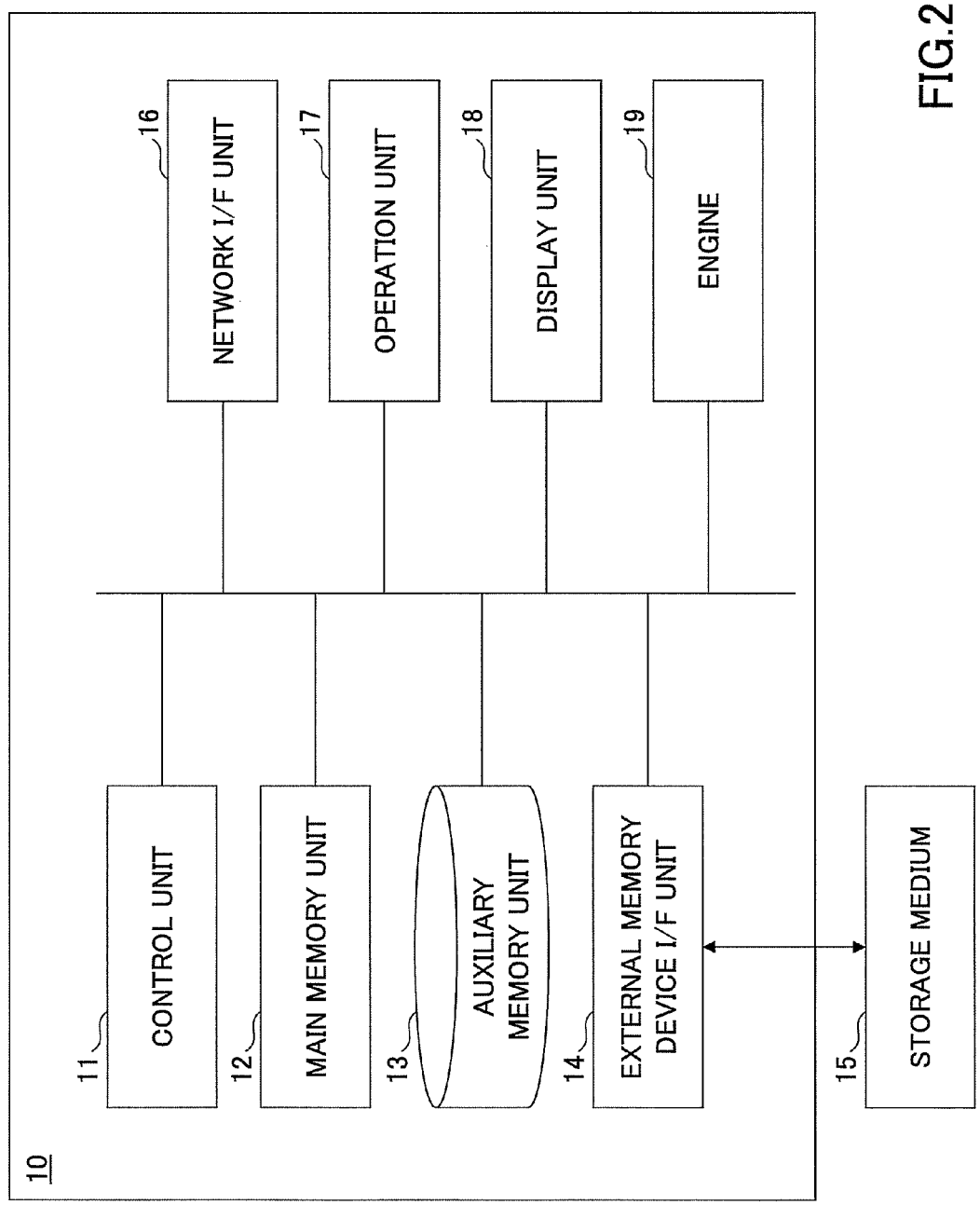
FIG. 2 is a hardware block chart of an example MFP of Embodiment 1.

Hardware of the MFP 10 and the image processing server 30 is described next. FIG. 2 illustrates an example MFP as hardware of Embodiment 1. As illustrated in FIG. 2, the MFP 10 includes a control unit 11, a main memory unit 12, an auxiliary memory unit 13, an external memory device I/F unit 14, a network I/F unit 16, an operation unit 17, and a display unit 18.

The control unit 11 is installed in a MFP and carries out controls of various units and portions, and arithmetic computation and processing of data in the MFP. The control unit 11 is an arithmetic device which executes programs stored in the main memory unit 12, receives data from an input device or a memory device, provides arithmetic computation and processing with these, and outputs the results to an output device or the memory device.

The main memory unit 12 may be a Read Only Memory (ROM) or a Random Access Memory (RAM), and constantly or temporarily store programs and data, processed by the control unit 11, such as an Operating System (OS) being basic software or an application software.

The auxiliary memory unit 13 may be a Hard Disk Drive (HDD) and stores data related to the application software or the like.

The external memory device I/F unit 14 is an interface between a storage medium 15 such as a flash memory and the MFP 10 connected via a data communication line such as a universal serial bus (USB).

The storage medium 15 stores a predetermined program, and the program stored in the recording medium 15 is installed in the MFP 10 via the external memory device I/F unit 14. The installed program becomes executable with the MFP 10.

The network I/F unit 16 is an interface between the MFP 10 and peripheral apparatuses which have a communication function and are connected to a network such as a Local Area Network (LAN) and a Wide Area Network (WAN) constructed of wired or wireless data transmission paths.

The operation unit 17 and the display unit 18 may be constructed of a Liquid Crystal Display (LCD) having a key switch (hardware keys) and a touch panel including software keys of Graphical User Interface (GUI). The operation unit 17 and the display unit 18 are User Interfaces (UI) for utilizing the functions of the MFP 10.

An engine unit 19 reads a paper manuscript and prints on a transfer paper as an input and output unit of the image data. The MFP 10 may further provide hardware such as a scanner.

Figure 3:
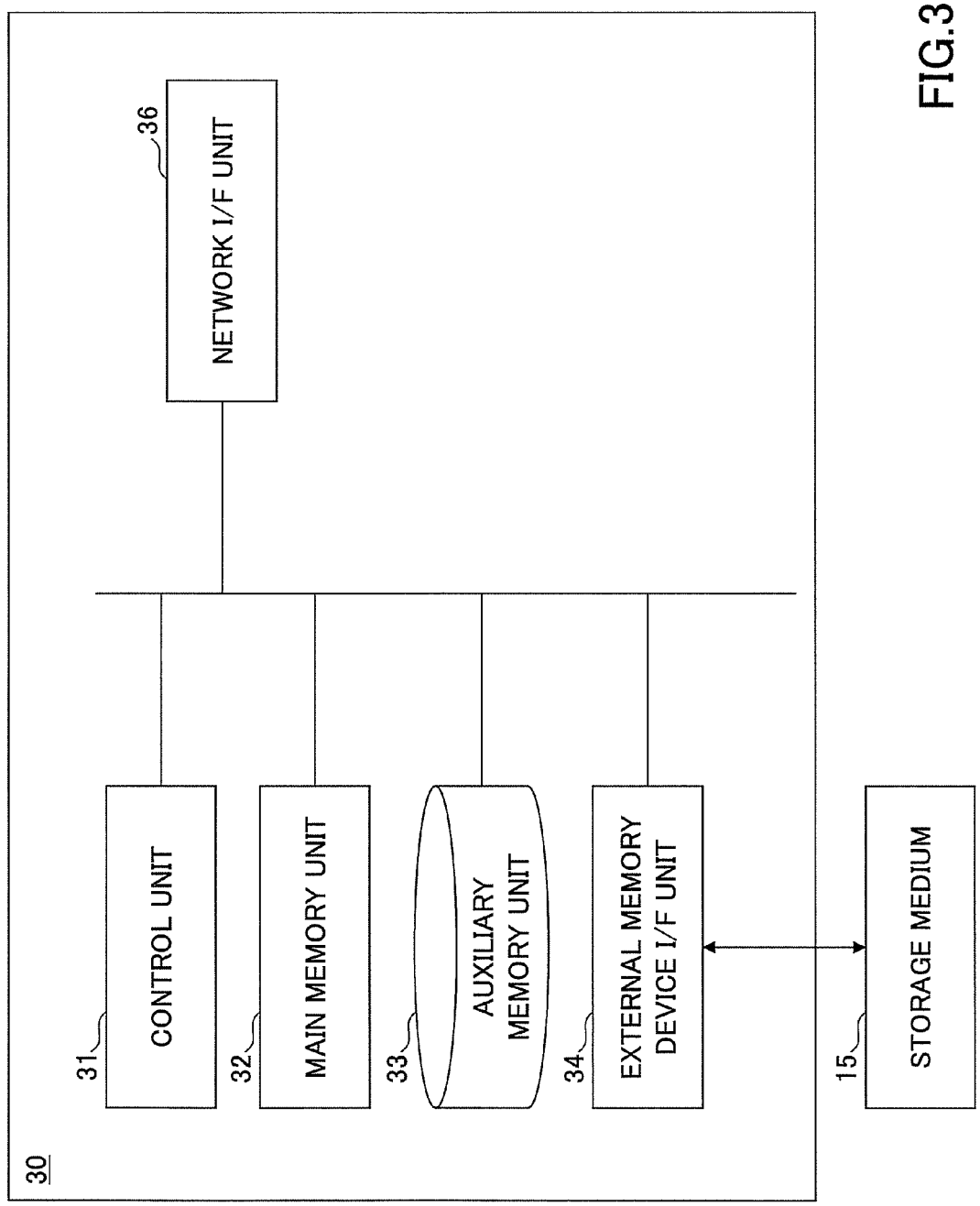
FIG. 3 is a hardware block chart of an example image processing server of Embodiment 1.

FIG. 3 is a hardware block diagram of an image processing server 30 of Embodiment 1. As illustrated in FIG. 3, the image processing server 30 includes a control unit 31, a main memory unit 32, an auxiliary memory unit 33, an external memory device I/F unit 34, and a network I/F unit 36.

The control unit 31 carries out controls of various units and portions, and arithmetic computation and processing of data in the image processing server. The control unit 31 is an arithmetic device which executes programs stored in the main memory unit 32, receives data from an input device or a memory device, provides arithmetic computation and processing with these, and outputs the results to an output device or the memory device.

The main memory unit 32 may be a ROM or a RAM, and constantly or temporarily store programs and data, processed by the control unit 31, such as an OS being basic software or an application software.

The auxiliary memory unit 33 may be a HDD and stores data related to the application software or the like.

The external memory device I/F unit 34 is an interface between the storage medium 15 such as a flash memory and the image processing server 30 connected via a data communication line such as a USB.

The storage medium 15 stores a predetermined program, and the program stored in the recording medium 15 is installed in the image processing server 30 via the external memory device I/F unit 34. The installed program becomes executable with the image processing server 30.

The network I/F unit 36 is an interface between the image processing server 30 and peripheral apparatuses which have a communication function and are connected to a network such as a LAN and a WAN constructed of wired or wireless data transmission paths.

<Function>

Figure 4:
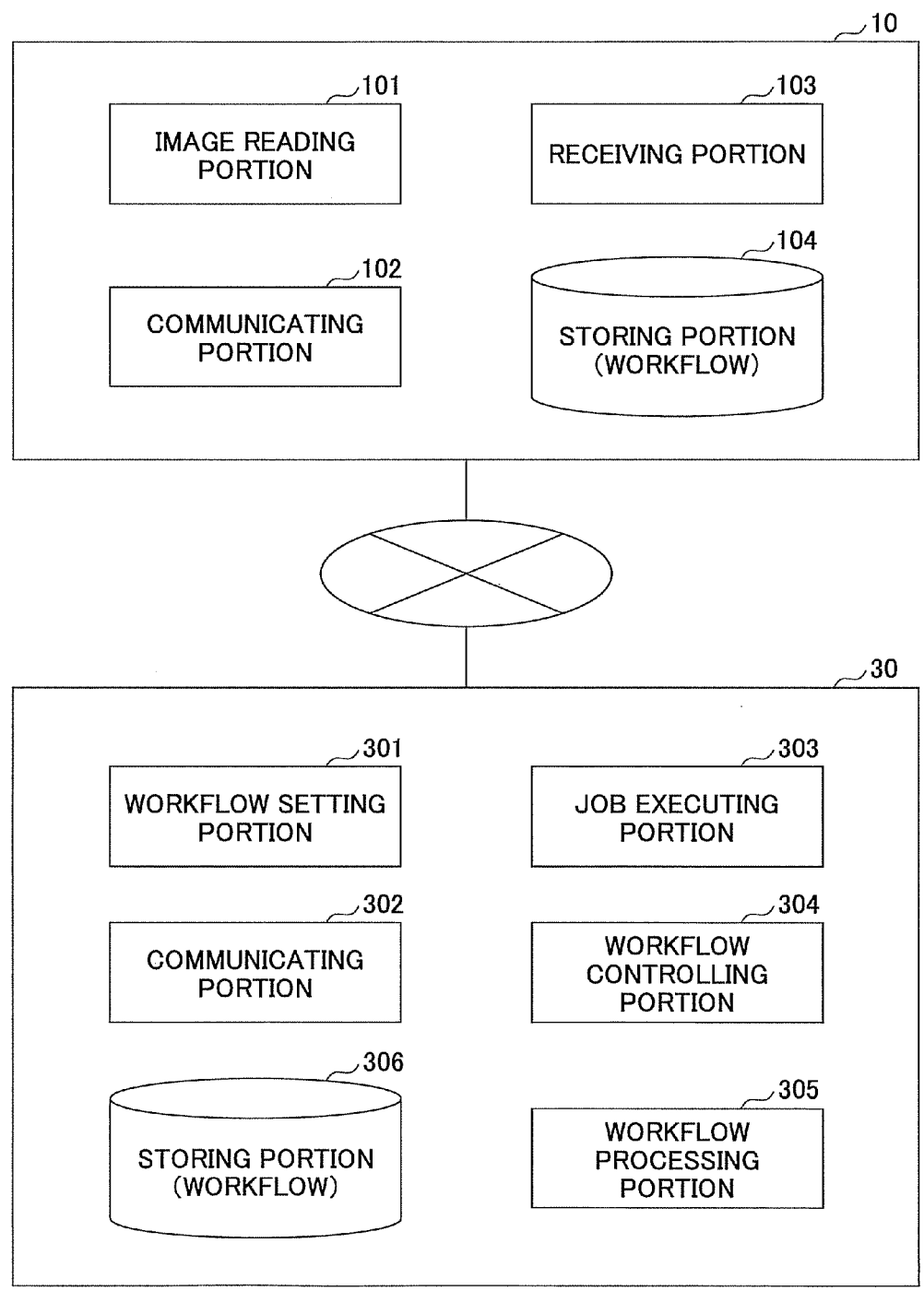
FIG. 4 illustrates example functions of the MFP and the image processing server of Embodiment 1.

FIG. 4 is a block diagram illustrating example functions of the MFP 10 and the image processing server 30 of Embodiment 1. First, the function of the MFP 10 is described. As illustrated in FIG. 4, the MFP 10 includes an image reading portion 101, a communicating portion 102, a receiving portion 103, and a storing portion 104. Functions ordinarily provided in MPFs such as a printer function, a copy function and a facsimile function are not illustrated.

The image reading portion 101 acquires the image data by reading a manuscript with a scan function. The image data are acquired via facsimile, from the information processing terminal 50, or from a hot folder on a network.

The communicating portion 102 transmits and receives apparatus information, image data or the like. Especially, the communicating portion 102 transmits the image data and a request for processing the image data to the image processing server 30 when the request for processing or the like is made by the user.

The receiving portion 103 receives a designation of the workflow from the user. The designation of the workflow may be carried out using an operations panel (e.g. the operation unit 17 and the display unit 18) of the MFP 10. At this time, bibliographic information of the process included in the workflow is input by the user. The bibliographic information may be an image type or an image size in case of an image converting process, and a mail address of a delivery destination in case of a mail delivery. The user ID as the bibliographic information is acquired from user information of the user who has logged into the system.

The storing portion 104 stores plug-ins of the image converting process and an output process, or one or more workflows formed by assembling the plug-ins. The storing portion 104 may not be provided. It is possible to acquire information related to the workflow from the storing portion 306 of the image processing server 30 without providing the storing portion 104. The image reading portion 101 can be realized by a scanner. The receiving portion 103 is realized by control of the operation unit 17 and the display unit 18 with the control unit 11, and the communicating portion 102 is realized by control of the external memory device I/F unit 14 with the control unit 11. The storing unit 104 may be realized by the auxiliary memory unit 33.

Next, the function of the image processing server 30 is described. The image processing server 30 includes a workflow setting portion 301, a communicating portion 302, a job executing portion 303, a workflow controlling portion 304, a workflow processing portion 305, and a storing portion 306.

When a user sets up a workflow formed by arbitrarily assembling plug-ins of the image converting process or the output process, the workflow setting portion 301 stores the set workflow in the storing portion 306 in, for example, a XML form. The workflow setting portion 301 controls a UI screen or the like for setting the workflow to be displayed on the information processing terminal 50.

Figure 5:
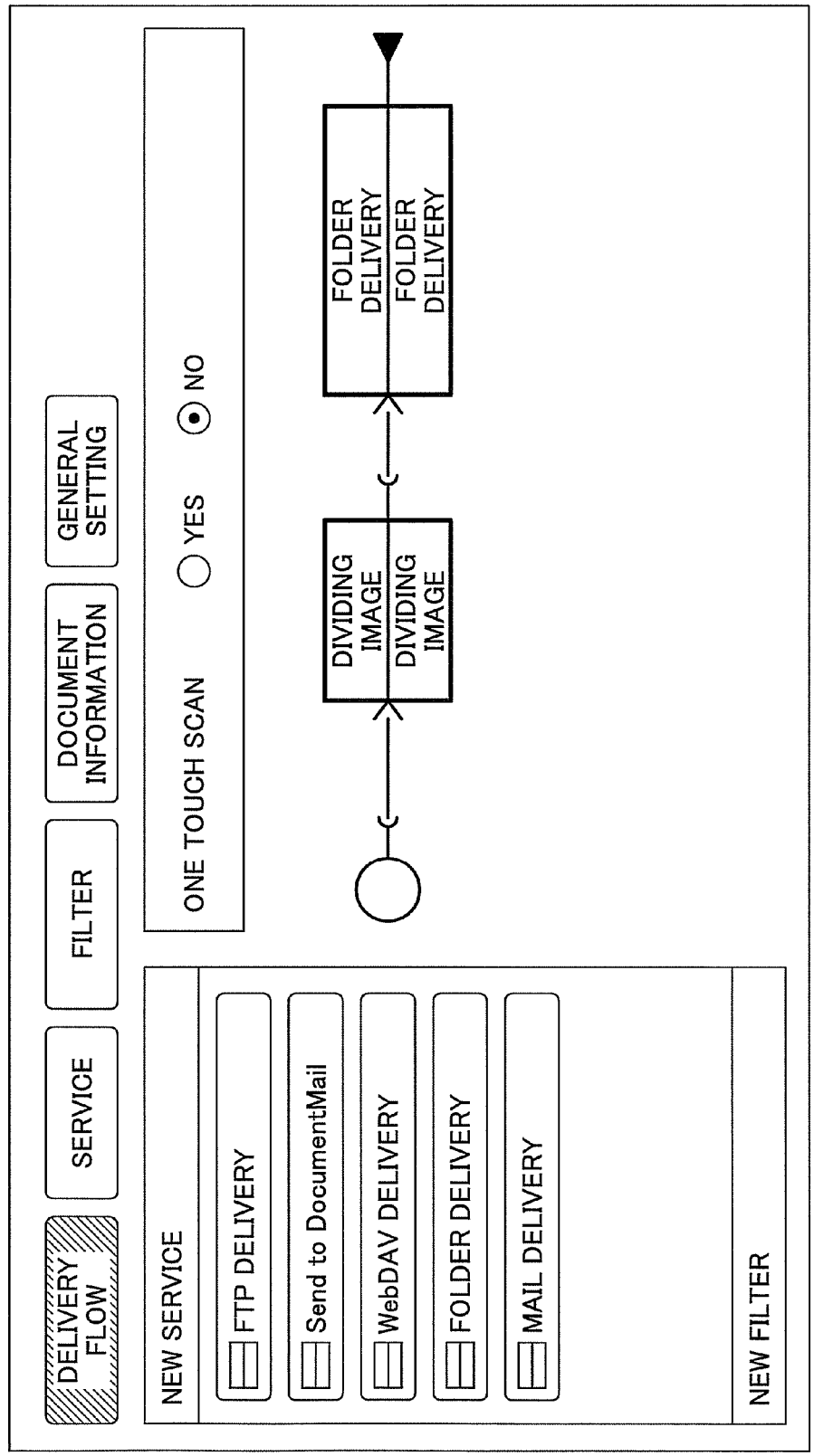

FIG. 5 illustrates an example of setting up a workflow and an image dividing plug-in. The screen illustrated in FIG. 5 is displayed in the display unit of the information processing terminal 50. The users can arbitrarily assemble the plug-ins to construct the workflow. The constructed workflow is transmitted to the image processing server 30 from the information processing terminal 50 and stored in the storing portion 306 described later.

Referring back to FIG. 4, the communicating portion 302 transmits and receives the apparatus information, the image data or the like. Specifically, the communicating portion 302 receives the image data from the MFP 10 and transmits the image data subjected to the image processing to a destination of delivering the workflow.

The communication portion 302 receives identification information of the workflow, bibliographic information of processes of the workflows and the like from the MFP 10. When a request for processing the workflow (e.g. job request) is received from the MFP 10, the communicating portion 302 outputs the identification information of the workflow, the bibliographic information of processing the workflows or the like to the job executing portion 303.

The job executing portion 303 carries out the job requested by the MFP 10. The job executing portion 303 sends the request for processing the workflow to the workflow controlling portion 304, and outputs the identification information of the workflows, the bibliographic information of processing the workflows or the image data to the workflow controlling portion 304.

When the workflow controlling portion 304 receives the request for processing the workflows from the job executing portion 303, the workflow controlling portion 304 controls execution of various processes which are included in the workflows. Further, when the workflow processing portion 305 receives an instruction for controlling the workflows from the workflow controlling portion 304, the workflow processing portion 305 carries out the workflows in conformity with the instruction and carries out the delivery. Said differently, the workflow processing portion 305 sequentially carries out the processes included in the workflows and delivers the image data to the destinations of delivery.

The processes carried out by the workflow processing portion 305 can be divided into the image converting process, the output process (delivery process) or the like. The image converting process is a process of converting an image data form, an image dividing process, or the like. The output process is a process of delivering the acquired image data of an image subjected to the image conversion to the destinations of delivery such as the mail delivery server and the image managing server 40. The workflow processing portion 305 carries out at least the output process.

The storing portion 306 stores plug-ins of the image converting process and the output process, or one or more workflows formed by assembling the plug-ins.

The workflow setting portion 301, the job executing portion 302, the workflow controlling portion 304, and the workflow processing portion 305 may be carried out by the control unit 31. The storing unit 306 may be realized by the auxiliary memory unit 33. The communicating portion 302 may be realized by controlling the external memory device I/F unit 34 with the control unit 31.

Figure 6:
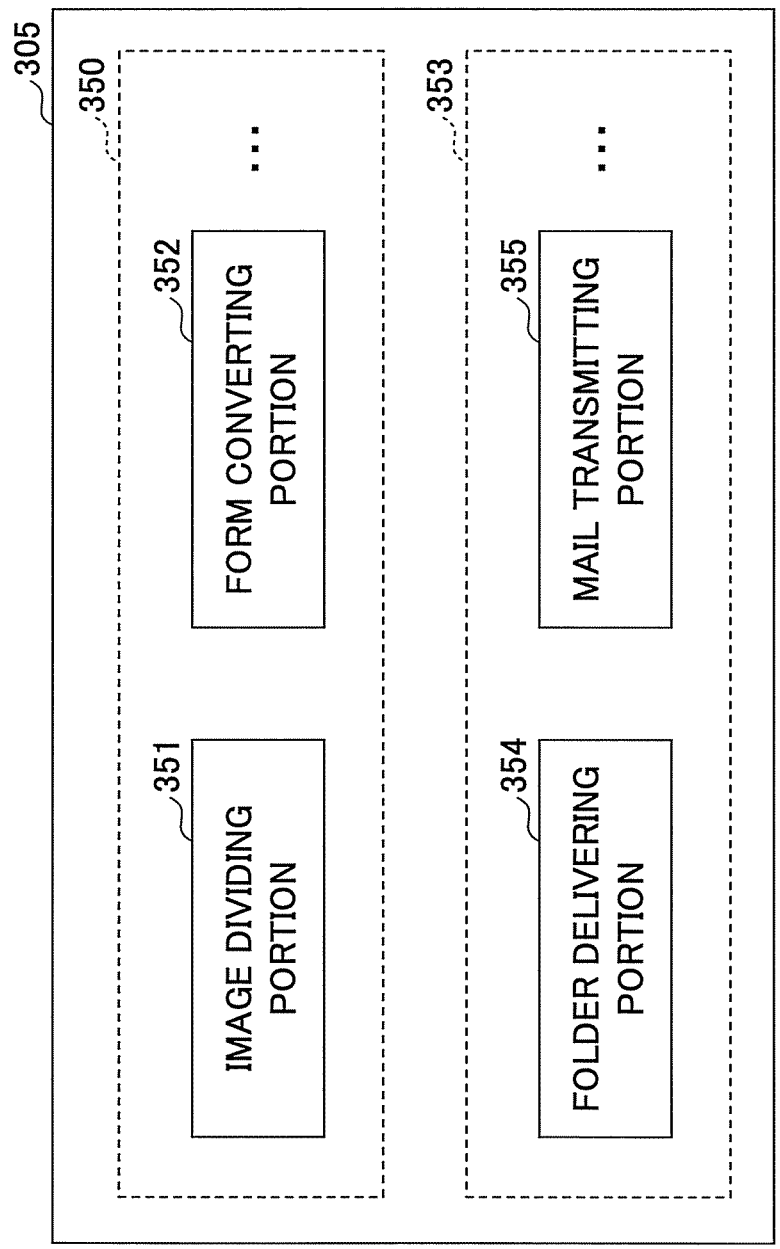
FIG. 6 is a block chart illustrating example functions of a workflow processing portion of Embodiment 1.

Next, the workflow processing portion 305 is described. FIG. 6 is a block diagram illustrating example functions of the workflow processing portion 305 of Embodiment 1. As illustrated in FIG. 6, the workflow processing portion 305 may include an image converting process portion 350 and an output processing portion 353.

The image converting process portion 350 includes an image dividing portion 351 and a form converting portion 352. The image dividing portion 351 divides the image data by using metadata of the image data. The metadata include a length, a width, a resolution, a compression type, an extension, or the like. The metadata include the length and width of the image data assizes of the longitudinal and lateral sides included in the metadata. When the width of the longitudinal side included in the metadata is less than the length, the width can be used as the size of the longitudinal side.

The image dividing portion 351 specifies the size of the longitudinal side from the metadata and vertically divides the longitudinal side in halves into two portions. For example, the image dividing portion 351 may divide an image of A3 size into two sheets of images of A4 size.

The image dividing portion 351 may convert the divided images into images arranged in a predetermined direction and having a predetermined size. For example, the image dividing portion 351 may rightwardly rotate the divided image by 90 degrees and enlarge the image to have the original size. With this, the image data aggregated in 2-in-1 may be converted to image data having the original size and direction.

The image dividing portion 351 may carry out character recognition in a predetermined region of the divided image data thereby acquiring a page number. The character recognition can be easily carried out by installing an Optical Character Recognition (OCR) function into the image processing server 30. The image dividing portion can arrange the divided image data in an order of pages by acquiring the page numbers. The process of arranging in the order of the pages may be carried out after converting to the image data having the predetermined direction and size. The predetermined region mentioned above is a region to which the page number is added, for example, and an end portion in the longitudinal side of the image data in case of 2-in-1.

The data form which can be handled by the image dividing portion 351 is TIFF (MH, MR, MMR, uncompressed:single page), TIFF-F (MH, MR, MMR, uncompressed:single page), DCX (single page), BMP (uncompressed), JPEG, EXIF, PNG, GIF, or the like.

The form converting portion 352 converts the data form of the image data. For example, the form converting portion 352 may convert to a desired data form such as a PDF format, a JPEG format, a BMP format or the like.

The output processing portion 353 carries out a process of outputting the image data to a destination of delivery. The output processing portion 353 includes a folder delivering portion 354, a mail transmitting portion 355, or the like. The folder delivering portion 354 delivers image data to a predetermined folder. The mail transmitting portion 355 transmits mail to which the image data are attached to a predetermined sender.

Figure 7A:
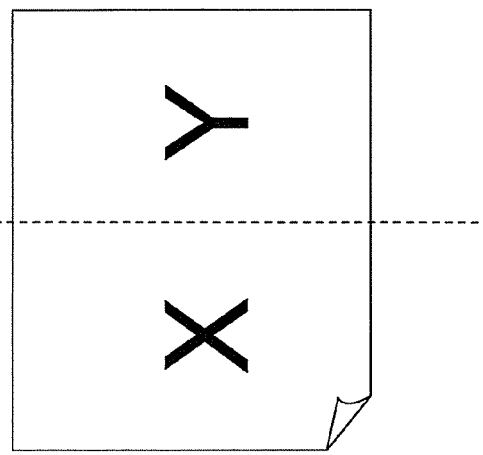
Figure 7B:
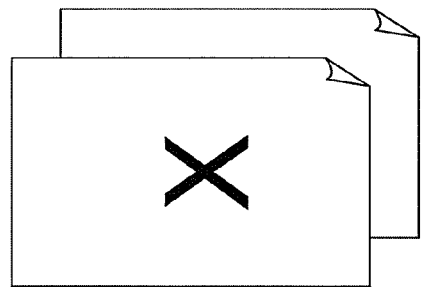
Figure 7C:
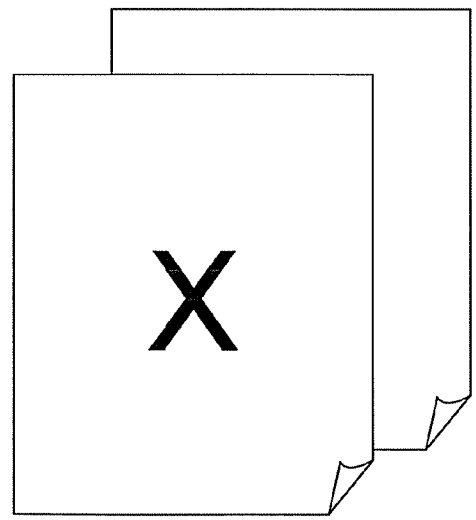

Hereinafter, a specific example of dividing images is described. The process of dividing images may be carried out by the image dividing portion 351. FIG. 7A, FIG. 7B and FIG. 7C illustrate an example 1 of dividing the image. FIG. 7A illustrates the image before the division and a dividing position represented by a dotted line. FIG. 7B illustrates the image divided at the dividing position. FIG. 7C illustrates images converted to have the same direction and size as those of the image before the division illustrated in FIG. 7B. The converting process illustrated in FIG. 7C is not indispensable.

In the case of FIG. 7B, the metadata of the divided image data have the length being the width of the image data before the division and the width being a half of the length of the image data before the division, and other items (e.g. resolution) the same as those of the metadata before the division. The metadata of the divided image data may be the same as the metadata of the original image data in the case of FIG. 70.

Figure 8A:
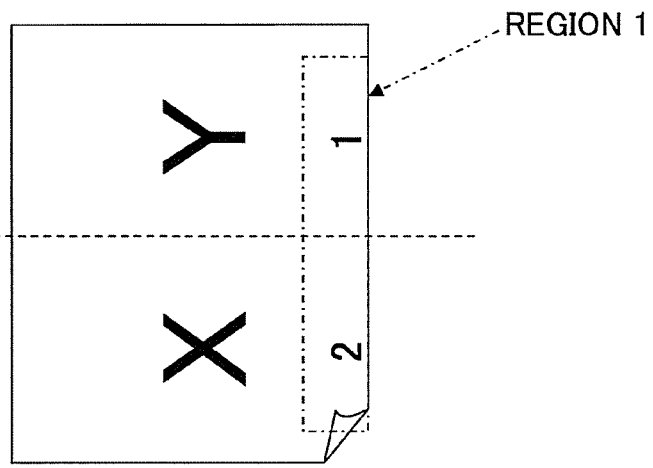
Figure 8B:
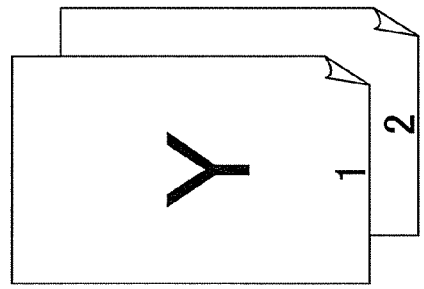
Figure 8C:
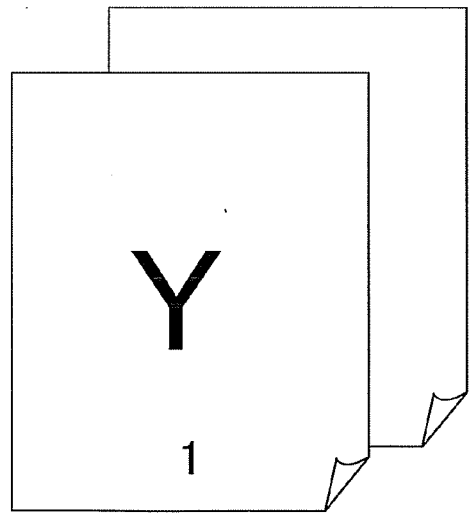

FIG. 8A, FIG. 8B and FIG. 8C illustrate an example 2 of dividing an image. Referring to FIG. 8A in comparison with FIG. 7A, a page number is added to the image. In case of 2-in-1, the image dividing portion 351 carries out character recognition for a region 1 (i.e. a right end region of the image) and acquires the page number. The region in which the character recognition is carried out may be previously set. FIG. 8B illustrates example images which are obtained by dividing the image illustrated in FIG. 8A and arranged in the order of the page numbers. The image dividing portion 351 can arrange the divided image data in the order of the page numbers using the image data acquired while carrying out the character recognition. FIG. 8C illustrates images converted to have the same direction and size as those of the image before the division illustrated in FIG. 8B. The converting process illustrated in FIG. 8C is not indispensable.

<Operations>

Figure 9:
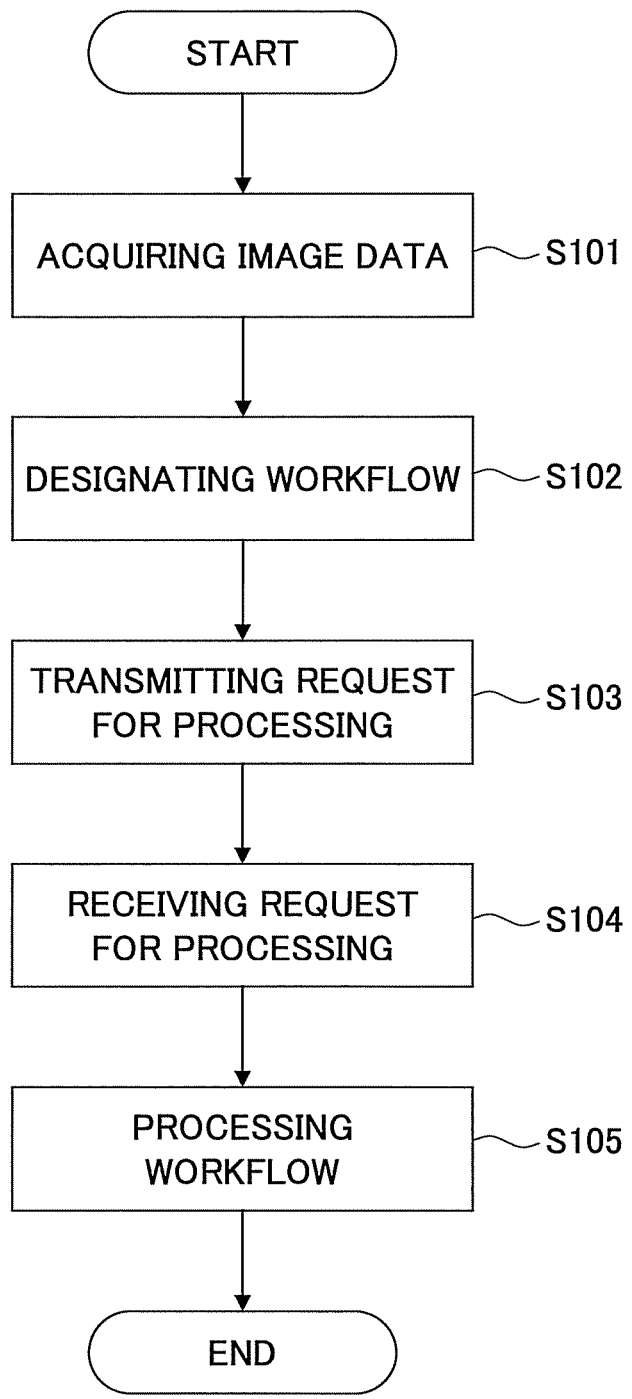
FIG. 9 is a flowchart of an example workflow process of Embodiment 1.

Next, an operation of the image processing system of Embodiment 1 is described. FIG. 9 is a flowchart of an example workflow process of Embodiment 1. In step S101 illustrated in FIG. 9, the MFP 10 reads the image data by a scanner or the like and acquires the image data. The MFP 10 may acquire the image data already stored in the main memory unit 12 or the auxiliary memory unit 13 in acquiring the image data. The MFP 10 may acquire the image data stored into a hot folder being an arbitrary folder in the network by using a function of the hot folder.

The receiving portion receives a workflow designated S102 by the user from the workflow displayed on the operations panel. When identification information is added to each workflow, the receiving portion 103 may output the received identification information and the image data of the received workflow to the communication portion 102.

In step S103, the communication portion 102 sends a request for processing the workflow including the identification information of the workflow along with the image data.

In step S104, the communication portion 302 of the image processing server 30 receives the request for processing the workflow containing the identification information of the workflow along with the image data from the MFP 10.

In step S105, the workflow controlling portion 304 refers to the storing portion 306 using the identification information of the workflow contained in the received request for processing the workflow and specifies processes included in the workflow. The workflow controlling portion 304 controls the order of the workflow and makes the workflow processing portion 305 carry out the processes. The workflow processing portion 305 carries out the processes included in the workflow and finally delivers the image data to a destination of delivery.

Figure 10:
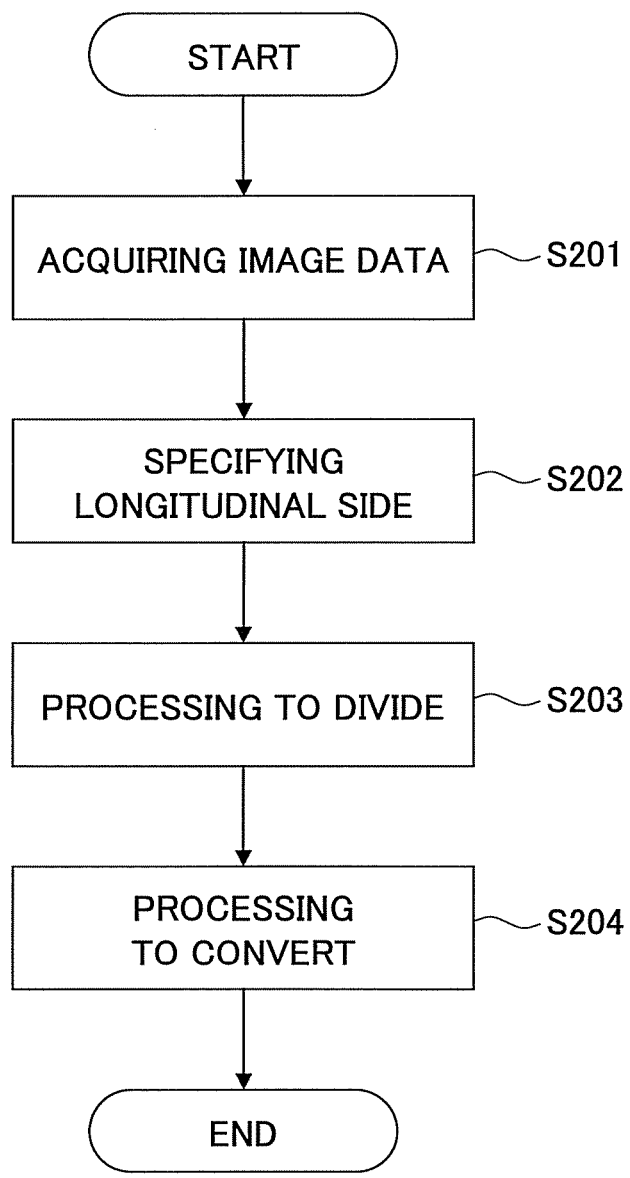
FIG. 10 is a flowchart of an example image dividing process of Embodiment 1.

Next, the process of the image dividing plug-in of Embodiment 1 is described. FIG. 10 is a flowchart of an example workflow process of Embodiment 1. When the image dividing plug-in is included in the workflow, the image dividing process is carried out by the image dividing portion 351 included in the workflow processing portion 305. In step S201 illustrated in FIG. 10, the image dividing portion 351 acquires the image data to be divided. The image data to be divided are acquired from the MFP 10.

In step S202, the image dividing portion 351 refers to the length of a side of the image contained in the metadata of the acquired image data and specifies the referred side as the longitudinal side. When the width of the image is greater than the length of the image, the width may be specified as the longitudinal side.

In step S203, the image dividing portion 351 vertically divides the image at a position halving the longitudinal side.

In step S204, the image dividing portion 351 rotates the divided image in a predetermined direction and enlarges the divided image to be a predetermined size. The predetermined direction may be 90 degrees in the clockwise direction, and the predetermined size may be A4 size. The image dividing portion 351 may carry out character recognition of the page numbers and rearrange the image data converted to have the predetermined size in the order of the page numbers. Step S204 is not indispensable.

With Embodiment 1, by installing the image dividing plug-in into the image processing server 30, it is possible to include the image dividing plug-in in the workflow. The image data are divided, and the divided image data may be delivered to the destination of delivery.

With Embodiment 1, it is possible to rotate the image in the predetermined direction and enlarge it to be the predetermined size. Further, with Embodiment 1, the page number may be subjected to character recognition thereby arranging the divided images or the converted images in the order of the page numbers.

Embodiment 2

Figure 11:
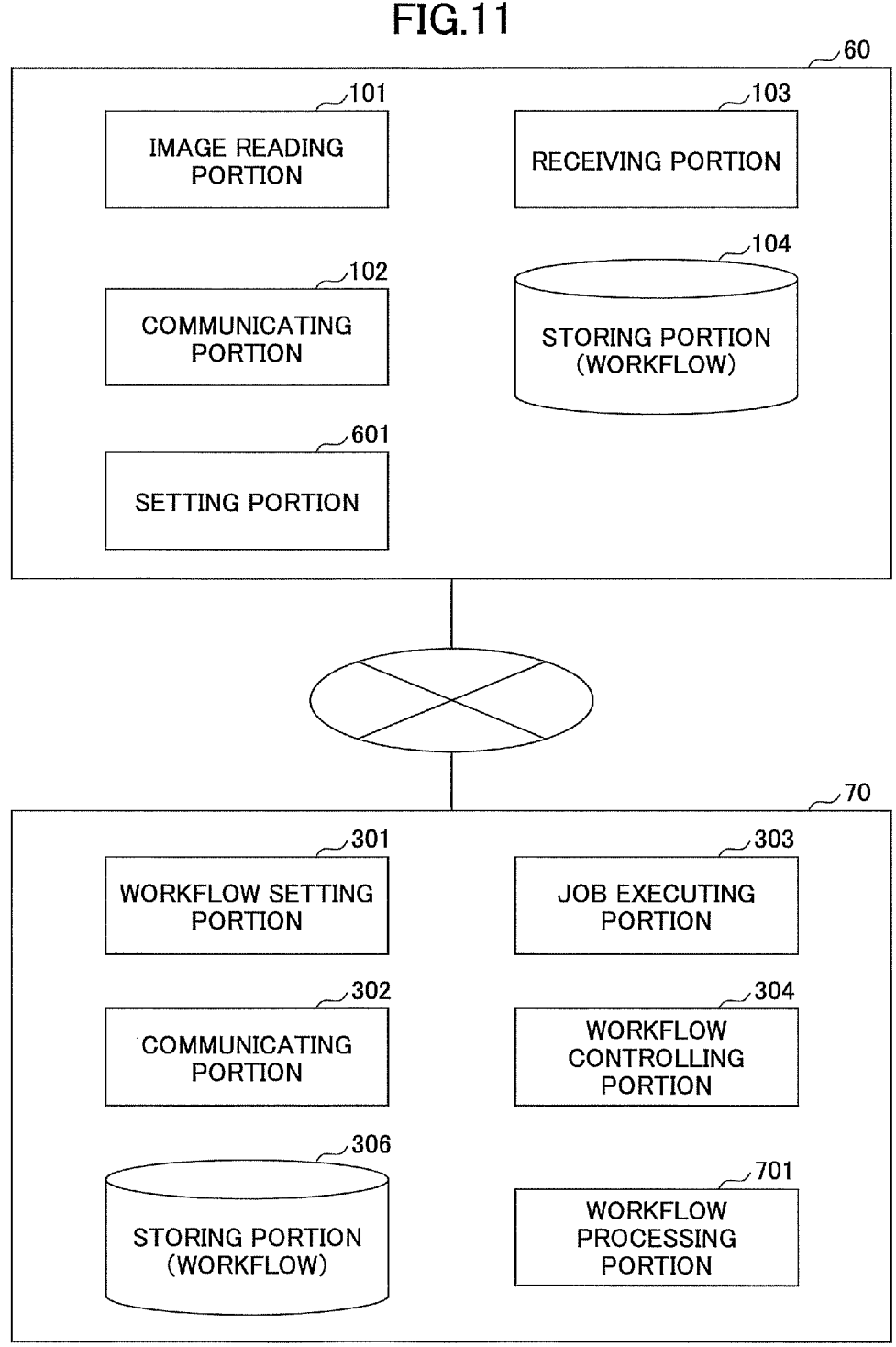
FIG. 11 illustrates example functions of the MFS' and the image processing server of Embodiment 2.

Next, the image processing server of Embodiment 2 is described. With Embodiment 2, the user can set the dividing position of the image. With this, the user can freely divide the image at a position desired by the user.
<Function>
Next, the function of the image processing server 70 of Embodiment 2 is described. FIG. 11 is a block diagram illustrating example functions of the MFP 60 and the image processing server 70 of Embodiment 2. With Embodiment 2, the components other than a setting portion 601 and a workflow processing portion 701 are similar to those of Embodiment 1.

The setting portion 601 illustrated in FIG. 11 makes a user set up a dividing position of the image on an operations panel of a MFP 60. The following two examples may be used in setting the dividing position.

Figure 12:
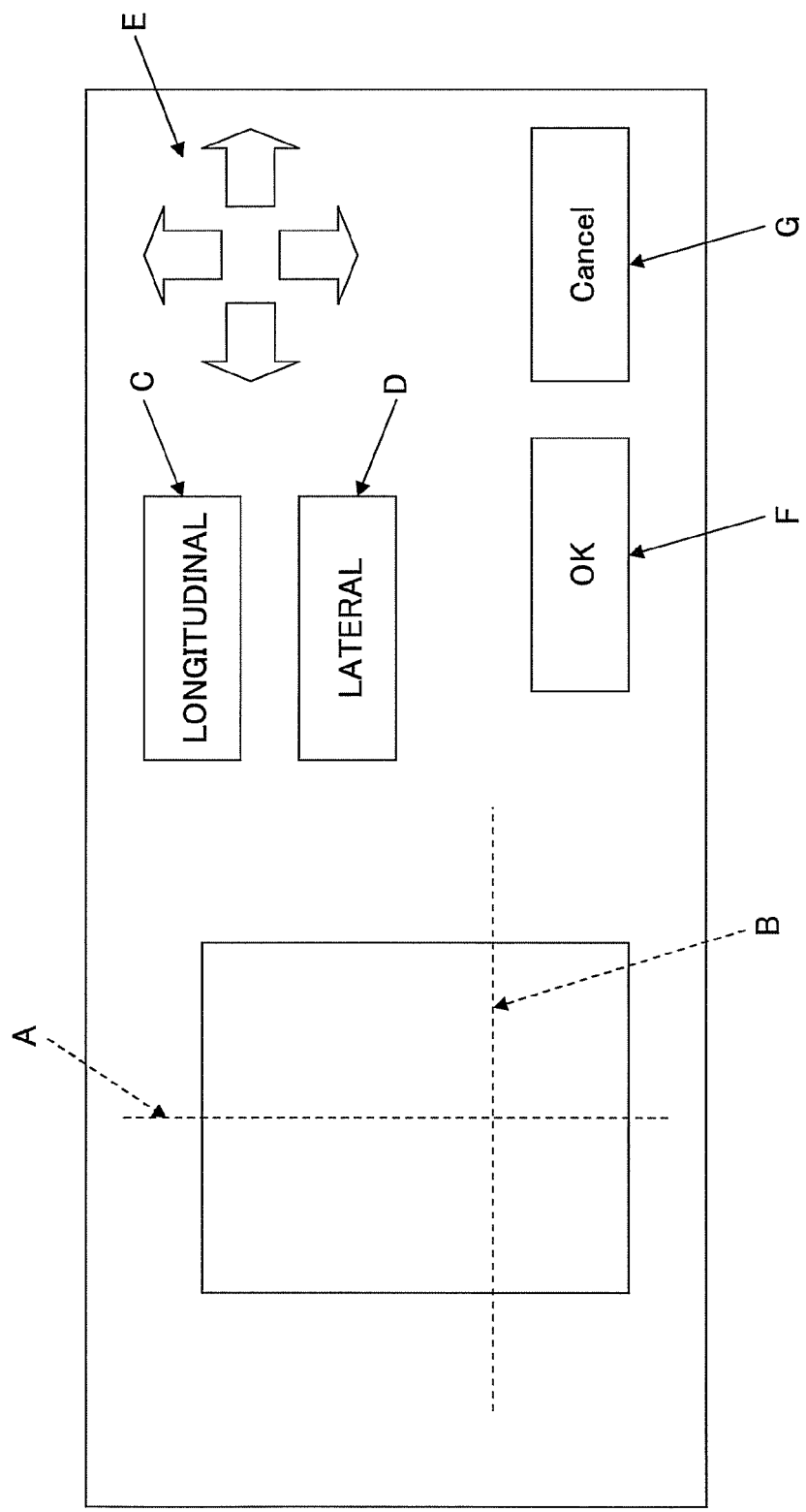
FIG. 12 illustrates a setup example 1 of a dividing position.

FIG. 12 illustrates a setup example 1 of a dividing position. As illustrated in FIG. 12, a longitudinal dividing position A and a lateral dividing position B are displayed on images displayed on an operations panel. When a longitudinal button C is pushed down, the longitudinal dividing position A is refrained from being displayed. When the longitudinal button C is pushed down again, the longitudinal dividing position is displayed again. A lateral button D is similar to the longitudinal button C.

A cursor E is displayed on the operations panel. When a cursor of a hardware key exists, the cursor of the hardware key may be used. There are functions for upward and downward moving of the dividing position A executed by using up and down arrows. There are functions for rightward and leftward moving of the dividing position B executed by using right and left arrows. An OK button F is provided to determine the longitudinal dividing position A and the lateral dividing position B relative to the image data. A Cancel button G is provided to reset the dividing position and return to an original workflow designating screen.

When the OK button F is pushed down, the setting portion 601 adds positional information for dividing the image data in the longitudinal and lateral positions to bibliographic information of the workflow.

Figure 13:
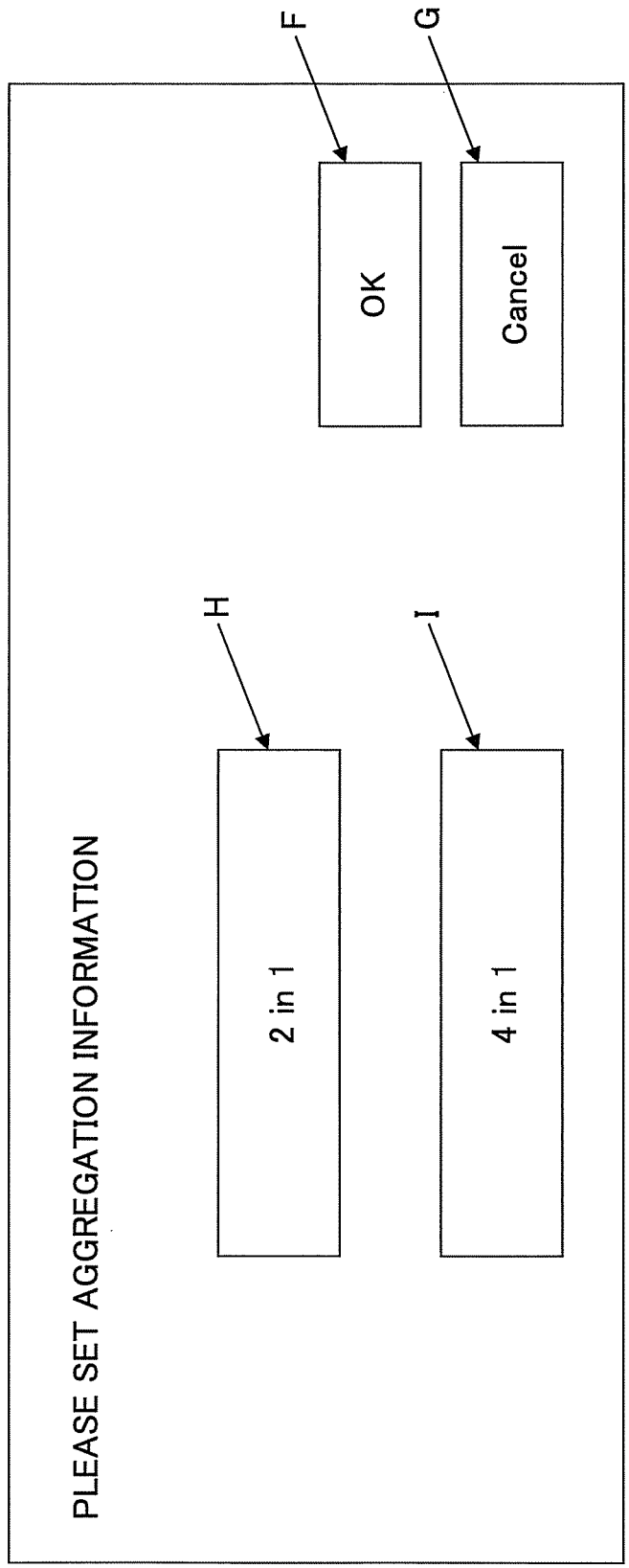
FIG. 13 illustrates a setup example 2 of a dividing position.

FIG. 13 illustrates a setup example 2 of the dividing position. As illustrated in FIG. 13, aggregation information is displayed on the operations panel. By pushing down a 2-in-1 button H or a 4-in-1 button I, the setting portion sets the aggregation information. Functions of an OK button F and a Cancel button G are similar to those illustrated in FIG. 12.

The setting portion 601 works to add the set aggregation information to the bibliographic information of the workflow. When the aggregation information is known, it is possible to specify the dividing position of the image. In the case of 2-in-1, as described in Embodiment 1, the longitudinal side of the image may be halved in a direction perpendicular to the longitudinal side. In the case of 4-in-1, the length and width contained in the metadata of the image are halved in perpendicular directions of the longitudinal and lateral directions, respectively. The setting portion 601 has a function of controlling a UI screen illustrated in FIG. 12 and FIG. 13.

Figure 14:
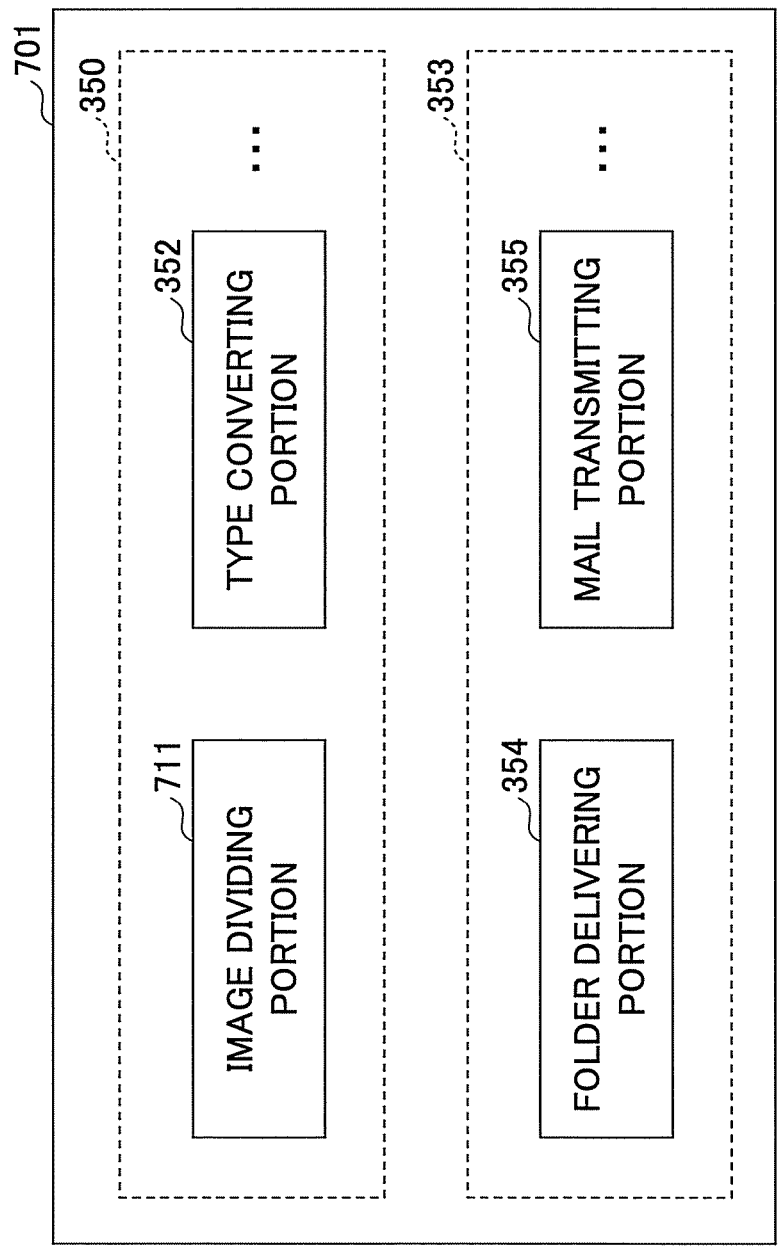
FIG. 14 is a block chart illustrating example functions of a workflow processing portion of Embodiment 2.

Referring back to FIG. 11, the workflow processing portion 701 carries out the dividing process at a dividing position set by the user. FIG. 14 is a block diagram illustrating example functions of the workflow processing portion 701 of Embodiment 2.

As illustrated in FIG. 14, functions other than that of the image dividing portion 711 are similar to the functions illustrated in FIG. 6. The image dividing portion 711 divides the image data based on dividing position information when the dividing position information is acquired. For example, with the setup example 1, because the longitudinal and a lateral dividing position are included in the request for processing the workflow, the image dividing portion 711 divides the image data in conformity with these dividing positions. For example, with the setup example 2, because the aggregation information is included in the request for processing the workflow, the image dividing portion 711 divides the image data based on the aggregation information.

Figure 15A:
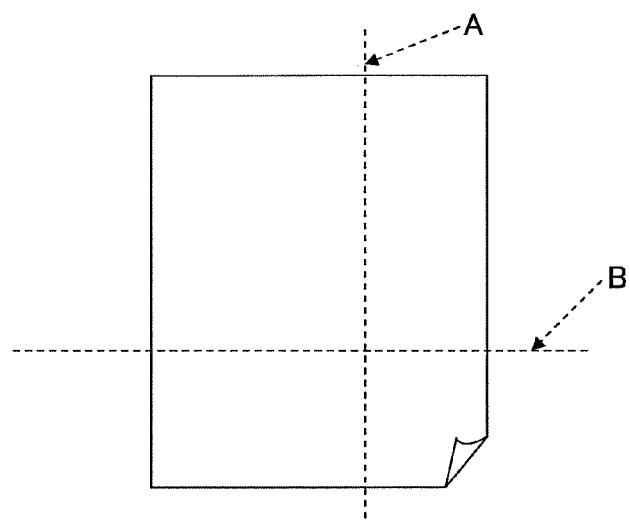
FIG. 15A, FIG. 15B and FIG. 15C schematically illustrate image division of the setup example 1.
Figure 15B:
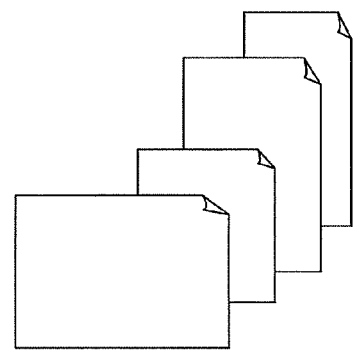
Figure 15C:
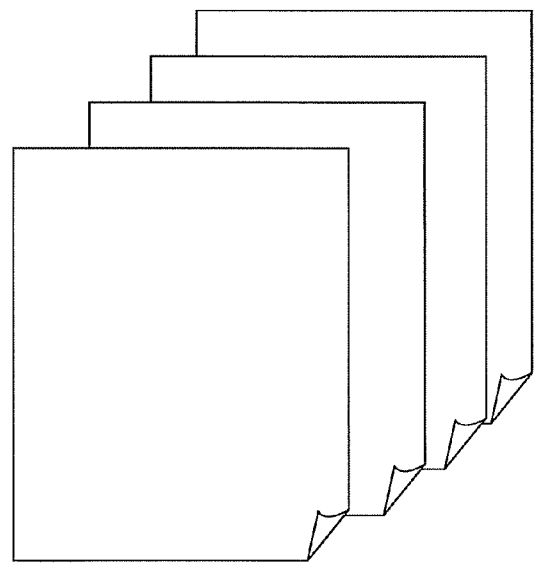

FIG. 15A, FIG. 15B and FIG. 15C are schematic views of dividing the image with the setup example 1. FIG. 15A illustrates the image before dividing the image data and the longitudinal dividing position A and the lateral dividing position B. FIG. 15B illustrates the images divided at the dividing positions. FIG. 15C illustrates image converted to have the same direction and size as those of the image data before the division illustrated in FIG. 15B. The converting process illustrated in FIG. 15C is not indispensable.

Metadata of the divided image data are set to have length and width after the division, and other parts of the metadata are the same as those of the original image data. The metadata of the divided image data may be the same as the metadata of the original image data in case of FIG. 15C.

Figure 16A:
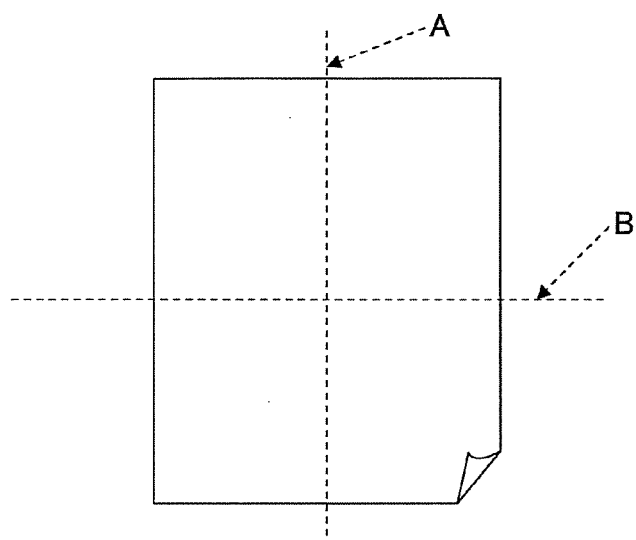
FIG. 16A, FIG. 16B and FIG. 16C schematically illustrate image division of the setup example 2.
Figure 16B:
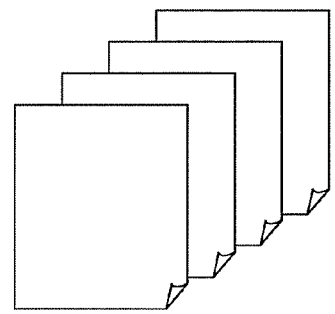
Figure 16C:
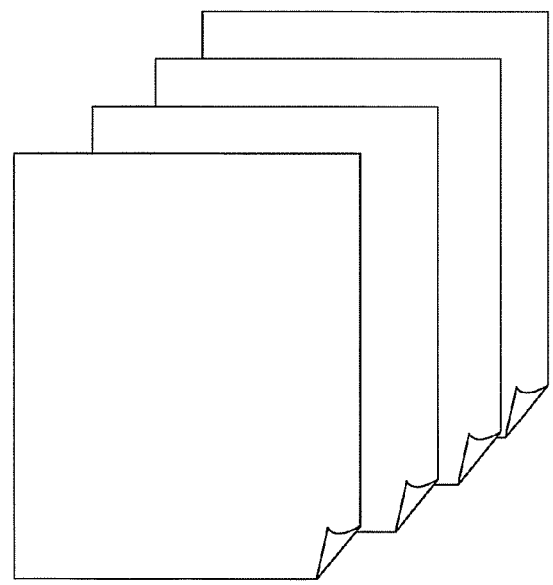

FIG. 16A, FIG. 16B and FIG. 16C are schematic views of dividing the image with the setup example 2. FIG. 16A illustrates the image before dividing the image data and a longitudinal dividing position A and a lateral dividing position B. In the setup example 2, when the aggregation information is known, the longitudinal dividing position A and the lateral dividing position B are determined. In the example illustrated in FIG. 16A, there is described a case where the aggregation information is 4-in-1.

FIG. 16B illustrates the image divided at the dividing positions. FIG. 16C illustrates the images converted to have the same direction and size as those of the image data before the division illustrated in FIG. 16B. The converting process illustrated in FIG. 16C is not indispensable.

The metadata of the divided image data are set to have the length and width respectively which are halves of the length and width of the original image, and other parts of the metadata are the same as those of the original image data. The metadata of the divided image data may be the same as the metadata of the original image data in case of FIG. 16C.

<Operations>

Figure 17:
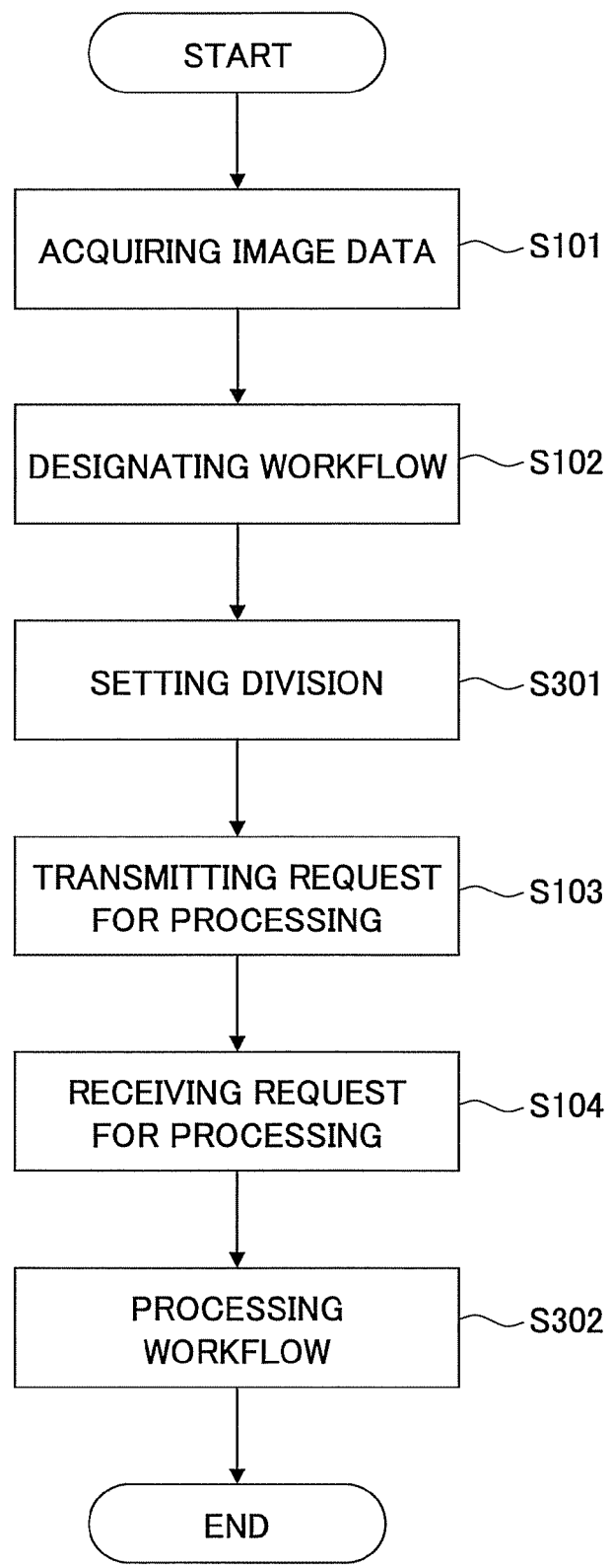
FIG. 17 is a flowchart of an example workflow process of Embodiment 2.

Next, an operation of the image processing server of Embodiment 2 is described. FIG. 17 is a flowchart of an example workflow process of Embodiment 2. Referring to FIG. 17, the identical numerical references are used for processes similar to those in FIG. 9, and description of these processes is omitted.

In step S301 of FIG. 17, the user sets the dividing position in the setting portion 601. The setup of the dividing positions is the same as those described in FIG. 12 and FIG. 13. The setting portion 601 can set the dividing portion by using any one of the setups illustrated in FIG. 12 and FIG. 13.

In step S302, the workflow processing portion 701 divides the image data based on the dividing position information set in step 301, and delivers the divided image data to the destination of delivery.

Figure 18:
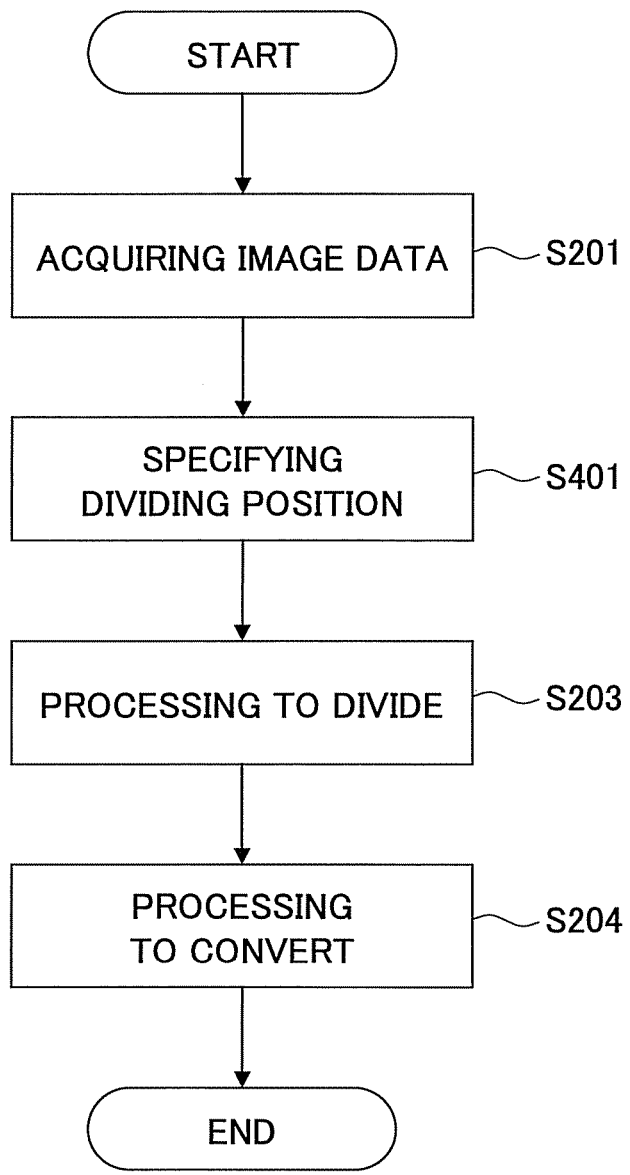
FIG. 18 is a flowchart of an example image dividing process of Embodiment 2.

Next, the process of the image dividing plug-in of Embodiment 2 is described. FIG. 18 is a flowchart of an example image dividing process of Embodiment 2. Referring to FIG. 18, the identical numerical references are used for processes similar to those in FIG. 10, and description of these processes is omitted.

In step S401 of FIG. 18, the image dividing portion 711 acquires dividing position information which includes the aggregation information and is included in the request for processing the workflow to thereby specify the dividing position of the image data. When the dividing position of the image data is specified, the rest of the processes are similar to those described with reference to FIG. 10.

With Embodiment 2, the page number is subjected to the character recognition of the page number, and the divided images or the converted images may be arranged in the order of the page number. When the page number is not attached to the image data, it is possible to designate the order of arranging the image data displayed on the operations panel. The order of arranging the image data may be contained in the bibliographic information and transmitted to the image processing server 70. The designation of the order of arranging the image data is similar to that in Embodiment 1.

As described, with Embodiment 2, the dividing position of the image data can be set by the user, and the image data are freely divided at a position desired by the user.

Modified Example

Next, a MFP in the modified example is described. In the modified example, the image processing server is assembled in the MFP. Functions of the MFP in which the image processing server is assembled in the modified example are basically similar to the functions of the MFP and image processing server illustrated in FIG. 4. The MFP of the modified example can carry out the processes described in the Embodiments.

Programs carried out in the image processing server of Embodiments 1 and 2 and the MFP of the modified example may be provided by being recorded in a computer readable recording medium such as a CD-ROM, a flexible disk (FD), a CD-R, a Digital Versatile Disk (DVD) in forms of files which can be installed in or executed by a computer.

The program executed by the image processing server of Embodiments 1 and 2 and the MFP of the modified example may be stored in a computer connected to a network such as the Internet and enabled to be installed via the network. Further, the program executed by the image processing server of Embodiments 1 and 2 and the MFP of the modified example may be served or distributed via the network such as the Internet.

Further, the program executed by the image processing server of Embodiments 1 and 2 and the MFP of the modified example may be stored in a ROM or the like and provided.

The program executed by the image processing server of Embodiments 1 and 2 and the MFP of the modified example may have a module structure in which the above described units and portions are included. Actual hardware is constructed such that a processor (CPU) reads out a program from the auxiliary memory unit and executes the program, while one or plural of the units and pieces of the program are loaded in the main memory to activate the units and pieces.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-009384 filed on Jan. 19, 2010, the entire contents of which are hereby incorporated herein by reference.

What is claimed is:

1. An image processing system including an image forming apparatus and an image processing apparatus connected via a network, wherein the image forming apparatus comprises:
a receiving portion configured to receive a designation of a workflow which is produced by arbitrarily assembling at least a plug-in of an image dividing and converting process for image data and a plug-in of an output process and includes an image dividing and converting process for dividing the image data;
a setting portion configured to set up dividing positional information designating an arbitrary dividing position, at which the image data are to be arbitrarily divided; and
a communicating portion configured to transmit a request for processing the workflow to the image processing apparatus along with the image data received from the image forming apparatus, the request for processing including the set up dividing positional information, wherein the image processing apparatus comprises:
a workflow controlling portion configured to carry out any one of the image dividing and converting process, the output process, and a divided image dividing and converting process included in the workflow when a request for carrying out the any one of the image dividing and converting process, the output process, and the image dividing and converting process is received from the image forming apparatus; and a workflow processing portion configured to carry out the workflow while dividing the image data by using a length of a longitudinal side of the image data based on a control with the workflow controlling portion and to divide the image data based on the set up dividing positional information.

2. The image processing system according to claim 1, wherein the image forming apparatus further comprises another setting portion configured to set up aggregation information for the image data, the request for processing transmitted from the communicating portion to the image processing apparatus includes the set aggregation information, and the workflow processing portion divides the image data by using a width of a lateral side of the image data received from the image forming apparatus in addition to the length of the longitudinal side based on the set aggregation information included in the request for processing.

3. The image processing system according to claim 1, wherein the workflow processing portion carries out character recognition of page numbers of the divided image data and arranges the divided image data in an order of the page numbers.

4. The image processing system according to claim 1, wherein the workflow processing portion converts the divided image data to have a predetermined size and a predetermined direction.

5. An image processing apparatus connected to an image forming apparatus via a network, the image processing apparatus comprising:
    a storing portion configured to store at least a plug-in of an image dividing and converting process and a plug-in of an output process;
    a communicating portion configured to receive a request for processing a workflow which is produced by arbitrarily assembling at least the plug-in of the image dividing and converting process and the plug-in of the output process and receive image data;
    a workflow controlling portion configured to control the image dividing and converting process and the output process when a request for carrying out the image dividing and converting process or the output process, which includes set up dividing positional information designating an arbitrary dividing position, at which the image data are to be arbitrarily divided, is received from the image forming apparatus; and
    a workflow processing portion configured to carry out the workflow while dividing the image data by using a length of a longitudinal side of the image data based on a control with the workflow controlling portion and to divide the image data based on the set up dividing positional information received from the image forming apparatus.

6. The image processing apparatus according to claim 5, wherein the workflow processing portion divides, when aggregation information indicative of aggregation of the image data is included in the request for processing, the image data by using a width of a lateral side of the image data received from the image forming apparatus in addition to the length of the longitudinal side based on the aggregation information.

7. The image processing apparatus according to claim 5, wherein the workflow processing portion carries out character recognition of page numbers of the divided image data and arranges the divided image data in an order of the page numbers.

8. The image processing apparatus according to claim 5, wherein the workflow processing portion converts the divided image data to have a predetermined size and a predetermined direction.

9. A non-transitory recording medium saving programs, the programs when executed by computers causing the computers to function as
    an image forming apparatus including:
        a receiving portion configured to receive a designation of a workflow which is produced by arbitrarily assembling at least a plug-in of an image dividing and converting process for image data and a plug-in of an output process and includes an image dividing and converting process for dividing the image data;
        a setting portion configured to set up dividing positional information designating an arbitrary dividing position, at which the image data are to be arbitrarily divided; and
        a communicating portion configured to transmit a request for processing the workflow to an image processing apparatus along with the image data received from the image forming apparatus, the request for processing including set up dividing positional information, and
    the image processing apparatus connected to the image forming apparatus via a network including
        a workflow controlling portion configured to carry out any one of the image dividing and converting process, the output process, and a divided image dividing and converting process included in the workflow when a request for carrying out the any one of the image dividing and converting process, the output process, and the image dividing and converting process is received from the image forming apparatus; and
    a workflow processing portion configured to carry out the workflow while dividing the image data by using a length of a longitudinal side of the image data based on a control with the workflow controlling portion and to divide the image data based on the set up dividing positional information.

* * * * *